(12) United States Patent
Karakas

(10) Patent No.: US 6,633,016 B2
(45) Date of Patent: Oct. 14, 2003

(54) RESISTANCE WELDING METHOD

(76) Inventor: Erdogan Karakas, Kleinburgwedeler Strasse 12, 30938 Burgwedel (DE)

(*) Notice: Subject to any disclaimer, the term of this patent is extended or adjusted under 35 U.S.C. 154(b) by 0 days.

(21) Appl. No.: 09/963,658

(22) Filed: Sep. 27, 2001

(65) Prior Publication Data

US 2002/0011472 A1 Jan. 31, 2002

Related U.S. Application Data

(63) Continuation of application No. PCT/EP00/02841, filed on Mar. 31, 2000.

(30) Foreign Application Priority Data

May 20, 1999 (DE) .......................................... 199 23 172

(51) Int. Cl.⁷ ............................................... B23K 11/24
(52) U.S. Cl. ....................................................... 219/110
(58) Field of Search ................................ 219/110, 109, 219/117.1, 86.24

(56) References Cited

U.S. PATENT DOCUMENTS

| | | | |
|---|---|---|---|
| 4,214,164 A | * 7/1980 | Traub et al. ................. | 219/110 |
| 4,409,461 A | 10/1983 | Mizutani | |
| 4,912,294 A | * 3/1990 | Tsujii ....................... | 219/86.24 |
| 4,973,815 A | 11/1990 | Ito et al. | |
| 5,237,147 A | 8/1993 | Pazzaglia | |
| 5,558,785 A | * 9/1996 | Killian et al. ............... | 219/110 |
| 5,965,038 A | * 10/1999 | Nomura et al. .............. | 219/110 |

FOREIGN PATENT DOCUMENTS

| | | |
|---|---|---|
| DE | 30 05 083 | 9/1989 |
| DE | 41 13 117 | 5/1992 |
| DE | 44 40 351 | 12/1995 |
| DE | 295 08 868 | 8/1996 |
| DE | 295 08 869 | 11/1996 |
| EP | 0 261 328 | 3/1988 |
| EP | 0 688 626 | 12/1995 |
| EP | 0 756 915 | 2/1997 |
| EP | 0 835 713 | 4/1998 |
| EP | 199 15 121 | 10/2000 |

OTHER PUBLICATIONS

Internationaler Recherchenbericht (4 pgs.) dated Mar. 31, 2000, PCT/EP00/02841.

Internationaler Vorläufiger Prüfungsbericht (5 pgs.) dated Mar. 31, 2000, PCT/EP00 /02841.

Notification of Transmittal of Copies of Translation of the International Preliminary Examination Report dated Oct. 11, 2001 (5 pgs.), PCT/EP00/02841.

* cited by examiner

Primary Examiner—Clifford C. Shaw
(74) Attorney, Agent, or Firm—Shlesinger, Arkwright & Garvey LLP

(57) ABSTRACT

In a resistance welding method using direct current in which a direct voltage that is applied to the welding electrodes is commutated. According to the invention, the polarity of the direct voltage applied to the electrodes is selected before or after each welding process according to at least one parameter detected during the welding process. Preferably, the selection of polarity of the direct voltage of the welding electrodes is controlled by control means before or after each welding operation. The inventive method prevents the welding electrodes from being worn on one side, which, in turn, increases their serviceable life or endurance.

25 Claims, 1 Drawing Sheet

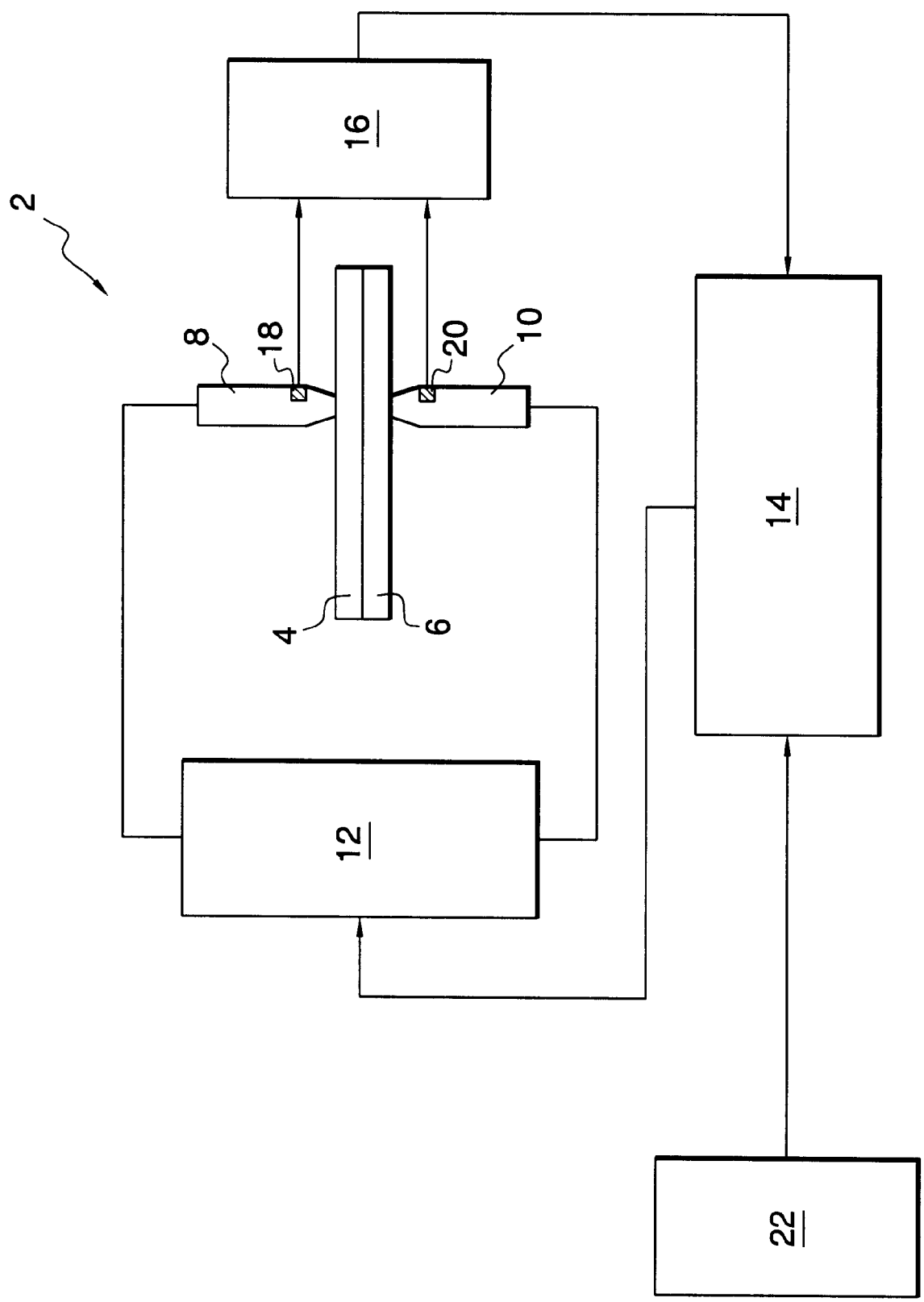

RESISTANCE WELDING METHOD

CROSS REFERENCE TO RELATED APPLICATIONS

This application claims the priority of International Application No. PCT/EP00/02841, filed Mar. 31, 2000, which claims the priority of German Application No. 199 23 172.9, filed May 20, 1999, and each of which is incorporated herein by reference.

This application relates to concurrently filed application Ser. No. 09/963,390, filed Sep. 27, 2001, which is a continuation of International Application No. PCT/EP00/02840, filed Mar. 31, 2000, which claims priority of both German Application No. 199 23 172.9, filed May 20, 1999 and German Application No. 199 15 121.0, filed Apr. 1, 1999.

FIELD OF THE INVENTION

The invention relates to a resistance welding method.

BACKGROUND OF THE INVENTION

During resistance welding using direct current, the welding electrodes are heated dissimilarly, whereby the welding electrode with positive polarity gets warmer than the welding electrode with negative polarity. This is due to the Peltier heat, and Joule's heat. The heating of the electrode with positive polarity on one side causes a reduction of serviceable life or endurance of this electrode. This is especially true when welding material with high heat conductivity, such as aluminum.

In order to avoid these disadvantages, it is known to use alternating current for welding.

A method and a device for resistance welding with alternating current is known from DE 41 13 117 C1. With this method a sequence of positive medium frequency current pulses is first created on the primary side of a welding transformer, and then a sequence of negative medium frequency current pulses is created and transferred to the welding electrodes connected to the secondary side of the transformer, so that the welding current is an alternating current. One disadvantage of the known method exists in the fact that the welding transformer not only has to transfer the medium frequency voltage pulses, but also the resulting current using low frequency, because the welding alternating current is gained on the primary side of the transformer. The welding transformer required for this is large and heavy, as well as costly to produce. Fundamentally, the welding alternating current must not have a rectangular shape in the known device, because the transfer behavior will not allow such a shape.

Similar devices are known from DE 30 05 083 C2 and EP 0 261 328 A1.

A method for resistance welding is known from DE 44 40 351 C1, with which a direct voltage applied to the welding electrodes is commutated in order to produce a welding alternating current, resulting in an alternating current with the positive and negative half waves essentially in a rectangular shape. According to the printed publication, this should avoid the welding spot being shifted toward the warmer positive electrode, and is therefore arranged in an asymmetrical way at a contact plane, in which the work pieces to be welded are making contact. This interferes with the stability of the welding joint. Further, the method known from the printed publication is to prevent uneven wear of the welding electrodes, which results in a reduction of serviceable life or endurance of the electrodes.

A device for the operation of the method known from DE 44 40 351 C1 is known from DE 295 08 868 U1.

A method for resistance welding of nails in an automatic nail machine is known from U.S. Pat. No. 4,409,461, with which a number of nails is fed to the welding electrodes of a welding unit by way of a rotating disk, and welded to a pair of wires. In this known method, a direct voltage applied to the welding electrodes is commutated using no control means before each welding operation.

SUMMARY OF THE INVENTION

The invention is based on the task of stating a process of resistance welding, with which high serviceability or endurance of the electrodes can be achieved, and which is simple to perform.

This task is solved as set forth below.

According to the invention, the polarity of the direct voltage at the welding electrodes is selected before or after each welding operation by a control means according to at least one parameter detected during the welding process. A welding process according to this invention is the operation, which produces a welding joint between the two work pieces to be welded, i.e., a welding point or a welding seam.

For example, if the measured temperature of both welding electrodes, hereinafter referred to as electrodes, shows that the positive electrode was heated more than the negative electrode, and that the temperature difference between the two electrodes exceeds a predetermined value, the direct voltage at the electrodes is then commutated before the next welding operation, for example before producing the next welding point, so that the electrode with an initially negative polarity, and now an electrode with positive polarity is now heated at a higher temperature.

It has unexpectedly been proven that the method according to this invention can increase the serviceable life or endurance substantially, without the necessity of commutation during the welding operation, as known from DE 44 40 351 C1.

According to the method relating to the invention, an even wear of the electrodes can be achieved. This will prevent premature wear and reduces setup time necessary due to exchanging the electrodes. In this way, the welding process can be operated at less cost. In addition, the method relating to the invention is simple, and can be produced with limited use of equipment.

Detecting at least one parameter of the welding process consists of the detection of a parameter or the parameters during the welding process, for instance during the creation of a welding point, as well as the detection of a parameter of the parameters before or after the actual welding operation. For example, it is possible to detect the temperature of the welding electrodes before, during, or after the welding operation. It is also possible, to detect at least one parameter during the welding operation, and at least one other parameter before or after the welding operation.

Further improvement of the teaching according to the invention includes the possibility that at least one parameter of the welding process is measured, and can then be used for selecting the polarity of the direct voltage at the electrodes. With this design, the selection of the polarity therefore occurs according to a measured parameter of the welding process. According to the invention, the parameter(s) can be measured during the welding operation, for example during the creation of a welding point. However, the parameters can also be measured before and/or after the welding operation.

According to further improvement of another design, another parameter is calculated from at least two measured parameters of the welding process, and used for selecting the polarity of the direct voltage at the welding electrodes. With this design, not only the measured parameters, but also the parameters derived from the measured parameters can be used for selecting the polarity.

According to the invention, any suitable parameters of the welding process can be used as the basis for the selection of the polarity before or after each welding operation. Preferably, the parameters of the welding process should include at least the following:

the temperature of the welding electrodes, and/or the degree of wear at the welding electrodes, and/or the total duration of the welding time, during which the welding operation took place at unchanged polarity since a previous commutation of the direct voltage, and/or the number of welding joints, especially the welding points or welding seams created at unchanged polarity since a previous commutation of the direct voltage, and/or the ratio of duration, during which the polarity of an electrode was positive for the creation of a number of welding joints at the duration, during which the polarity of the electrode was negative for the creation of a number of welding joints, and/or the thickness and/or the material of the work pieces to be welded.

These parameters by themselves, or in combination with each other, represent a reliable basis for the selection of the polarity of the electrodes.

An additional beneficial improvement of the design includes the possibility to select the polarity of the direct voltage at the electrodes during the creation of a number of welding joints, or during a predetermined time interval in such a way, that the sum of the welding times, during which the polarity of an electrode is positive, is essentially the same sum as the welding times, during which the polarity of the electrode is negative. With this design, the electrodes are therefore "stressed" with the same amount of positive, and negative polarity, so that an uneven wear can be avoided reliably.

Another improvement of the method according to the invention includes the possibility to externally enter at least one parameter of the welding process into an input device connected to the control means. With this design, data such as thickness and/or the material of the work pieces to be welded can, for instance, be externally entered by an operator and used by itself, or in combination with additionally measured parameters as the basis for the selection of the polarity of the direct voltage of the welding electrodes.

The degree of wear of the welding electrodes can be detected in any suitable way. According to the improvement of the design, the degree of wear of the welding electrodes is detected with the use of optical means.

The temperature of the welding electrodes can be detected in any suitable way. According to one design, the temperature of the welding electrodes is measured contact-less, especially with means for measuring of infrared radiation, as for example in an infrared camera.

The invention is further described using the attached drawing, which illustrates in its only figure a device for performing the process according to the invention.

BRIEF DESCRIPTION OF THE DRAWING

FIG. 1 illustrates a device for performing the process according to the invention.

DETAILED DESCRIPTION OF THE INVENTION

The drawing illustrates a general device, identified as 2, for resistance welding of aluminum sheets 4, 6, which is equipped with welding electrodes 8, 10. The welding electrodes 8, 10 are connected to a device 12, which in creating a welding alternating current applies a commutating direct voltage to the welding electrodes 8, 10 using essentially rectangular-shaped positive and negative half waves. The construction of the device 12 is generally known to technicians, and will therefore not be described in detail.

According to the invention, the polarity of the direct voltage of the welding electrodes 8, 10 is selected before or after each welding operation, for example before or after creating a welding point, according to at least one parameter detected during the welding process. The selection of the polarity is handled in the example by control means 14.

The control means 14 are connected to measuring means 16, which measure the temperature of the welding electrodes in the example with the use of temperature sensors 18, 20 as parameters of the welding process, and transfer those to the control means 14. In addition to the temperature of the welding electrodes 8, 10, the measuring means can also measure any other suitable parameters of the welding process, for instance the total duration of the welding time, during which welding took place at unchanged polarity since a previous commutation of the direct voltage, and/or the number of welding points created at unchanged polarity since a previous commutation of the direct voltage, and/or the ratio of duration, during which the polarity of an electrode was positive at the duration, during which the polarity of the electrode was negative during the creation of a number of welding joints. Additionally, the control means 14 can also calculate additional parameters from the measured parameters of the welding process.

For the external input of the parameters of the welding process, for example the data of the material and/or the thickness of the aluminum sheet 4, 6 to be welded, the device 2 is equipped with an input device 22 in the form of a keyboard connected to the control means 14.

The process according to the invention is performed with the device according to FIG. 2 in this example as follows:

If, for instance, the aluminum sheets 4, 6 are to be joined together with a number of welding points, the material and/or the thickness of the aluminum sheets to be welded can externally be entered into the input device 22 before the beginning of the welding operations. Subsequently, the control means 14 select the polarity of the direct voltage of the electrodes 18, 20 and regulate the device 12 in such a way, that it applies a direct voltage with the selected polarity to the welding electrodes 8, 10, so that the first welding point is created. Any optional polarity of the direct voltage can be selected for the first welding operation with cold and not yet worn welding electrodes.

The measuring means 16 measure the temperature of the welding electrodes 18, 20 during the welding operation. If, for instance, the polarity of the welding electrode 8 was initially positive, and the measured temperature of the welding electrodes 8, 10 shows that the welding electrode 8 is heated more than the welding electrode 10, and the temperature difference between the welding electrodes 8, 10 has exceeded a predetermined value, the control means 14 regulate the device 12 in such a way, that it commutates the direct voltage of the welding electrodes 8, 10, so that when setting the next welding point, the polarity of the welding electrode 10 is now positive.

If the measured temperature of the welding electrodes 8, 10 shows no uneven heating occurring at the welding electrodes 8, 10, or a temperature difference between the welding electrodes 8, 10 has not exceeded a predetermined value, the polarity of the welding electrodes 8, 10 can remain unchanged. A regulation of the device 12 by the control means 14 for commutating the direct voltage does not take place.

In similar manner, the polarity of the welding electrodes 8, 10 is selected before each welding operation, i.e., before setting of each welding point. If, for instance, the polarity of the direct current remained unchanged during the setting of the first ten welding points, and the measured temperature of the welding electrodes 8, 10 before setting the eleventh welding point shows that a temperature difference between the welding electrodes 8, 10 exceeds a predetermined value, the control means 14 then regulate the device 12, which in turn commutates the direct voltage of the welding electrodes 8, 10.

In addition to the temperature of the welding electrodes 8, 10, or instead of the temperature, the parameters of the welding process mentioned above, as well as any other suitable parameters can possibly be used as the basis for the selection of the polarity of the direct voltage of the welding electrodes 8, 10 before or after each welding operation.

The method according to the invention reliably prevents a one-sided wear of the welding electrodes 8, 10, increasing the serviceable life or endurance of the welding electrodes 8, 10. This reduces the setup time necessary for exchanging the welding electrodes 8, 10 due to premature wear, thus reducing the costs for the welding process.

While this invention has been described as having a preferred design, it is understood that it is capable of further modifications, and uses and/or adaptations of the invention and following in general the principle of the invention and including such departures from the present disclosure as come within the known or customary practice in the art to which the invention pertains, and as may be applied to the central features hereinbefore set forth, and fall within the scope of the invention or limits of the claims appended hereto.

What is claimed is:

1. Resistance welding method, comprising:
   a) using direct current in which a direct voltage that is applied to welding electrodes is commutated; and
   b) the polarity of the direct voltage of the welding electrodes is selected before each welding of a weld according to at least one parameter detected during the welding of a weld.

2. Method according to claim 1, wherein:
   a) at least one parameter of the welding of a weld is measured and used for selecting the polarity of the direct voltage of the welding electrodes.

3. Method according to claim 2, wherein:
   a) an additional parameter is determined from at least two measured parameters of the welding of a weld and used for selecting the polarity of the direct voltage of the electrodes.

4. Method according to claim 2, wherein:
   a) the degree of wear of the welding electrodes is detected using an optical device.

5. Method according to claim 2, wherein:
   a) the temperature of the welding electrodes is measured contact-less.

6. Method according to claim 5, wherein:
   a) the temperature of the welding electrodes is measured using an infrared radiation measurement device.

7. Method according to claim 6, wherein:
   a) the infrared radiation measurement device includes an infrared camera.

8. Method according to claim 1, wherein:
   a) the at least one detected parameter of the welding of a weld includes at least one of:
      i) the temperature of the welding electrodes;
      ii) the degree of wear of the welding electrodes;
      iii) the total duration of the welding time, during which the welding of a weld took place at unchanged polarity since a previous commutation of the direct voltage;
      iv) the number of welding joints created at unchanged polarity since a previous commutation of the direct voltage;
      v) the ratio of duration, during which the polarity of an electrode was positive for the creation of a number of welding joints to the duration, during which the polarity of the electrode was negative for the creation of a number of welding joints; and
      vi) one of the thickness and the material of the work pieces to be welded.

9. Method according to claim 1, wherein:
   a) the polarity of the direct voltage of the welding electrodes is selected during a number of weldings of a weld, and during one predetermined time interval in such a way, that the sum of the welding times during which the polarity of an electrode is positive, is essentially equal to the sum of welding times, during which the polarity of the electrode is negative.

10. Method according to claim 1, wherein:
    a) at least one parameter of the welding of a weld can be externally entered into an input device connected to a control.

11. Resistance welding method, comprising:
    a) using direct current in which a direct voltage that is applied to welding electrodes is commutated; and
    b) the polarity of the direct voltage of the welding electrodes is selected after each welding of a weld according to at least one parameter detected during the welding of a weld.

12. Method according to claim 11, wherein:
    a) at least one parameter of the welding of a weld is measured and used for selecting the polarity of the direct voltage of the welding electrodes.

13. Method according to claim 11, wherein:
    a) an additional parameter is determined from at least two measured parameters of the welding of a weld and used for selecting the polarity of the direct voltage of the electrodes.

14. Method according to claim 11, wherein:
    a) the at least one detected parameter of the welding of a weld includes at least one of:
       i) the temperature of the welding electrodes;
       ii) the degree of wear of the welding electrodes;
       iii) the total duration of the welding time, during which the welding of a weld took place at unchanged polarity since a previous commutation of the direct voltage;
       iv) the number of welding joints created at unchanged polarity since a previous commutation of the direct voltage;

v) the ratio of duration, during which the polarity of an electrode was positive for the creation of a number of welding joints to the duration, during which the polarity of the electrode was negative for the creation of a number of welding joints; and vi) one of the thickness and the material of the work pieces to be welded.

15. Method according to claim 11, wherein:

a) the polarity of the direct voltage of the welding electrodes is selected during a number of weldings of a weld, and during one predetermined time interval in such a way, that the sum of the welding times during which the polarity of an electrode is positive, is essentially equal to the sum of welding times, during which the polarity of the electrode is negative.

16. Method according to claim 11, wherein:

a) at least one parameter of the welding of a weld can be externally entered into an input device connected to a control.

17. Method according to claim 11, wherein:

a) the degree of wear of the welding electrodes is detected using an optical device.

18. Method according to claim 11, wherein:

a) the temperature of the welding electrodes is measured contact-less.

19. Method according to claim 18, wherein:

a) the temperature of the welding electrodes is measured using an infrared radiation measurement device.

20. Method according to claim 19, wherein:

a) the infrared radiation measurement device includes an infrared camera.

21. Resistance welding method, comprising:

a) using direct current in which a direct voltage that is applied to welding electrodes is commutated; and b) the polarity of the direct voltage of the welding electrodes is selected after each welding of a weld according to at least one parameter detected after the welding of a weld.

22. Method according to claim 21, wherein:

a) an additional parameter is determined from at least two measured parameters of the welding of a weld and used for selecting the polarity of the direct voltage of the electrodes.

23. Method according to claim 21, wherein:

a) the at least one detected parameter of the welding of a weld includes at least one of:

i) the temperature of the welding electrodes;

ii) the degree of wear of the welding electrodes;

iii) the total duration of the welding time, during which the welding of a weld took place at unchanged polarity since a previous commutation of the direct voltage;

iv) the number of weldings of a weld created at unchanged polarity since a previous commutation of the direct voltage;

v) the ratio of duration, during which the polarity of an electrode was positive for the creation of a number of welding of welds to the duration, during which the polarity of the electrode was negative for the creation of a number of welding of welds; and vi) one of the thickness and the material of the work pieces to be welded.

24. Method according to claim 21, wherein:

a) the polarity of the direct voltage of the welding electrodes is selected during a number of weldings of a weld and during one predetermined time interval in such a way, that the sum of the welding times during which the polarity of an electrode is positive, is essentially equal to the sum of welding times during which the polarity of the electrode is negative.

25. Method according to claim 21, wherein:

a) a further parameter is detected before the welding of a weld.

* * * * *